(12) United States Patent
Lakshmanan et al.

(10) Patent No.: US 8,768,062 B2
(45) Date of Patent: Jul. 1, 2014

(54) ONLINE SCRIPT INDEPENDENT RECOGNITION OF HANDWRITTEN SUB-WORD UNITS AND WORDS

(75) Inventors: Lajish Vimala Lakshmanan, Thane (IN); Sunil Kumar Kopparapu, Thane (IN)

(73) Assignee: Tata Consulting Services Limited (IN)

( * ) Notice: Subject to any disclaimer, the term of this patent is extended or adjusted under 35 U.S.C. 154(b) by 303 days.

(21) Appl. No.: 13/292,145

(22) Filed: Nov. 9, 2011

(65) Prior Publication Data
US 2012/0114245 A1 May 10, 2012

(30) Foreign Application Priority Data

Nov. 9, 2010 (IN) .......................... 3080/MUM/2010

(51) Int. Cl.
*G06K 9/00* (2006.01)
*G06F 3/0488* (2013.01)

(52) U.S. Cl.
CPC ........ *G06K 9/00409* (2013.01); *G06F 3/04883* (2013.01)
USPC ......................................... 382/186

(58) Field of Classification Search
USPC ................................ 382/186, 189
See application file for complete search history.

(56) References Cited

U.S. PATENT DOCUMENTS

| 4,284,975 | A | | 8/1981 | Odaka | |
|---|---|---|---|---|---|
| 4,365,235 | A | | 12/1982 | Greanias et al. | |
| 5,550,931 | A | | 8/1996 | Bellegarda et al. | |
| 5,862,251 | A | * | 1/1999 | Al-Karmi et al. | 382/186 |
| 6,011,865 | A | | 1/2000 | Fujisaki et al. | |
| 6,370,269 | B1 | * | 4/2002 | Al-Karmi et al. | 382/197 |
| 6,389,166 | B1 | | 5/2002 | Chang et al. | |
| 7,359,551 | B2 | * | 4/2008 | Napper | 382/186 |
| 7,587,087 | B2 | | 9/2009 | Nurmi | |
| 7,925,088 | B2 | | 4/2011 | Bhaskarabhatla | |
| 7,974,472 | B2 | | 7/2011 | Zou et al. | |
| 2006/0126936 | A1 | | 6/2006 | Bhaskarabhatla | |
| 2008/0159625 | A1 | * | 7/2008 | Bhaskarabhatla | 382/179 |
| 2010/0128985 | A1 | * | 5/2010 | El-Sana et al. | 382/189 |

FOREIGN PATENT DOCUMENTS

WO    2006090404 A1    8/2006

* cited by examiner

*Primary Examiner* — Hadi Akhavannik
(74) *Attorney, Agent, or Firm* — Hayes Soloway P.C.

(57) ABSTRACT

The present invention relates to a method and system for online script independent recognition of handwritten sub-word unit and words. More particularly the present invention relates to a system and method which enables online recognition of script independent sub-word unit and words by recognizing the written individual strokes prior to recognition of sub-word unit and words. The present invention provides an easy and natural to use method for handwritten sub-word unit and word recognition, wherein the application can be deployed on the existing communication means.

6 Claims, 8 Drawing Sheets

ONLINE SCRIPT INDEPENDENT RECOGNITION OF HANDWRITTEN SUB-WORD UNITS AND WORDS

FIELD OF THE INVENTION

The present invention relates to a method and system for online script independent recognition of handwritten sub-word unit and words. More particularly the present invention relates to a system and method which enables online recognition of script independent sub-word unit and words by recognizing the written individual strokes prior to recognition of sub-word unit and words.

BACKGROUND OF THE INVENTION AND PRIOR ART

With the rapid advancement in technology, the mode of communication and the means used for communication has improved by leaps and bounds to meet the ever increasing demand of the population.

"Short messaging service" acronym SMS, chatting and e-mails are some of the common communication modes used by people all over the world. These communication modes are cost effective, easy and comfortable.

In recent times PDAs, palmtops and handheld personal computer (PC) are more frequently being used for composing short messages (SMS) and e-mails. These messages are generally composed in English using the conventional keyboard of PC's or regular keypads of mobile handsets.

The biggest challenge for word processing in other languages such as Germanic, Slavic, Romanic and Indic languages is a vexing experience, considering the constraint to use the regular keyboard, designed for English language.

The present day input mode of communication means often tends to be of less user friendly for individuals originating from places like India especially because of the several existing Indic (Indian) languages scripts. Further communicating by mode of short messages and e-mails in scripts of these languages using the conventional keyboard or mobile keypad is both difficult and time consuming.

A solution that has been employed is the transliteration of these language (Germanic, Slavic, Romanic and Indic languages) texts in English, which allows the use of the English keyboard to enter the scripts of these language texts. However this requires the user to be able to write the non-English language text in English alphabets which requires English literacy.

For this reason a feasible and probably the only option for script independent message composition for the English non-literate population that is paving way, is to the use the electronic pen (e-pen) or a stylus touching a pressure sensitive surface in lieu of the keyboard to write sub-word units.

Hence, online handwritten character recognition (OHCR) is of prime importance especially in the context of communicating short messages and e-mails for script independent languages.

Though advantageous, online handwritten character recognition (OHCR) is available for English, Chinese and Japanese languages, and surprisingly relatively less work has been reported for language scripts such as Germanic, Indic, and Romanic and so on.

Hence there is an urgent need to provide a method and system to enable online script independent recognition of sub-words and words.

Some of the inventions which deal with providing online handwritten script recognition are as follows:

U.S. Pat. No. 5,550,931 titled "Automatic handwriting recognition using both static and dynamic parameters" provides a method and apparatus for recognizing handwritten characters in response to an input signal from a handwriting transducer. Though '931 patent provides a feature extraction and reduction procedure that relies on static or shape information, it fails to relate the temporal order in which points are captured by an electronic tablet.

U.S. Pat. No. 6,011,865 titled "Hybrid on-line handwriting recognition and optical character recognition system" provides a method and a system for hybrid on-line handwriting recognition and optical character recognition. Though '865 patent provides a handwriting recognition system and method that employs both online and off-line Hand writing recognition to achieve a recognition accuracy that is improved over the use of either technique when used alone, it fails to provide and perform feature extraction and spatio-temporal analysis for ascertaining if the recognized sequences of strokes are valid or not and thereby which enhances character recognition accuracy.

U.S. Pat. Nos. 4,284,975, 6,389,166 and 4,365,235 disclose a pattern recognition system operating in particular for Chinese handwritten characters, online handwritten Chinese character recognition apparatus based on character shapes and a Chinese/Kanji online recognition system consisting of tablet electronics module, a signal filter and segment integration unit, a base stroke classification unit, a symbol element recognition unit and a symbol recognition output table respectively.

U.S. Pat. No. 7,587,087 titled "On-line handwriting recognition" discloses a method and a device for on-line handwriting recognition; wherein the use of at least one auxiliary line is displayed on a touch sensitive panel. Each of the auxiliary lines constitutes a portion of more than one character of a character set. A character of a character set is drawn on the touch sensitive panel by completing one of the at least one auxiliary line into the character. The drawn character is recognized on the basis of said completion. Though '087 patent relates to online handwriting recognition, it fails to recognize the stroke leading to recognition of the character. Instead the character is recognized only on completion of writing the character.

US patent application number 20060126936 titled "System, method, and apparatus for triggering recognition of a handwritten shape" discloses a technique that uses repetitive and reliably recognizable parts of handwriting, during digital handwriting data entry, to trigger recognition of digital ink and to repurpose handwriting task area properties. Though '936 application discloses a system and method for handwritten shape recognition, it fails to provide and perform feature extraction and Spatio-temporal analysis for ascertaining if the recognized sequences of strokes are valid or not and thereby enhancing character recognition accuracy. Further, the recognition technique of '936 patent application attempts to find the character that most closely matches the strokes entered on the tablet and returns the results on run instead of showing results when the user finishes writing.

US patent application number 20080159625 titled "System, Method and Apparatus for Automatic Segmentation and Analysis of Ink Stream" discloses a technique that provides for real-time segmentation of handwritten traces during data entry into a computer. Though '625 application discloses a system and method for automatic segmentation and analysis of ink stream, it fails to provide and perform feature extraction and lexicon based domain specific word knowledge for recognition of characters and words.

US patent application number 20090003705 titled "Feature Design for HMM Based Eastern Asian Character Recognition" provides a method for online character recognition of East Asian characters includes acquiring time sequential, online ink data for a handwritten East Asian character, conditioning the ink data to produce conditioned ink data where the conditioned ink data includes information as to writing sequence of the handwritten East Asian character and extracting features from the conditioned ink data where the features include a tangent feature, a curvature feature, a local length feature, a connection point feature and an imaginary stroke feature. Though '705 application discloses a system and method for Eastern Asian Character Recognition, it fails to identify and construct a primitive stroke database which encompasses the handwritten script and the recognition engine primarily which recognizes their primitives prior to character and word recognition and further does not provide for a lexicon based domain specific word knowledge used for identification of characters and words.

PCT application number 2006090404 titled "System, Method, and Apparatus for Accommodating Variability in Chunking the Sub-Word Units of Online Handwriting" provides a technique for automatic real-time segmentation of an ink stream that does not require learning any chunking methodology, style of writing, and/or a predefined symbol set. In one example embodiment, this is achieved by drawing one or more strokes associated with a desired word of a script in one or more boxes provided on a digitizer screen using a pen. Though '404 application discloses a system and method for online handwriting recognition, it fails to provide for feature extraction and spatio-temporal analysis for ascertaining if the recognized sequences of strokes are valid or not and thereby enhancing character recognition accuracy.

The current state of arts restricts the universal application of the short messaging service and e-mail communication mode for script dependent online handwritten sub-word unit and words recognition. Hence there is an urgent need to provide a method and system to enable communication using the existing Short messaging service and e-mail communication means by employing an application for online recognition of script independent handwritten sub-word unit and words.

In light of the above mentioned prior arts it is evident that there is a need to have a customizable solution for online script independent recognition of handwritten sub-word unit and words.

In order to address the long felt need of such a solution, the present invention provides a method and system for online script independent recognition of handwritten sub-word unit and words. More particularly the present invention relates to a system and method which enables online recognition of script independent sub-word unit and words by recognizing the written individual strokes prior to recognition of sub-word unit and words.

OBJECTS OF THE INVENTION

The principle object of the invention is to provide a system and method for online script independent recognition of handwritten sub-word unit and words.

Another object of the invention is to enable online script independent recognition of handwritten sub-word unit and words by recognizing the written individual strokes prior to recognition of sub-word unit and words.

Yet another object of the invention is to provide a system and method to enable use of online script independent recognition of handwritten sub-word unit and words engine on the communication means.

Yet another object of the invention is to provide a system and a method for online script independent recognition of handwritten sub-word unit and words through identification of the primitive strokes and the structure of the written language script.

Yet another object of the present invention is to provide overcome the existing challenges in online handwritten recognition for scripts such as but not limited to the large size of the sub-word unit set, larger similarity between different sub-word units in the script and huge variation in writing style, by providing a system and method for focusing on stroke identification prior to sub-word unit and word recognition.

Yet another object of the invention is to provide a system and method for identification of a small (compared to the size of the sub-word unit set of the language) set of primitives, which encompasses a script; wherein the handwriting recognition engine primarily recognizes these primitives prior to sub-word unit and words Yet another object of the invention is to provide a system and method for modeling and representing the stroke using Fuzzy Directional Feature (FDF) set.

Yet another object of the invention is to define rule sets for sub-word unit formation from a sequence of strokes and make use of the spatio-temporal knowledge of the script to ascertain the validity of the recognized sequence of strokes.

Yet another object of the invention is to provide an easy to use and robust system for online script independent recognition of handwritten sub-word unit and words.

SUMMARY OF THE INVENTION

The present invention discloses a system and method for online script independent recognition of handwritten sub-word unit and words.

The user provides input in the form of online script independent handwritten text input via the input means of the communication means.

According to the present invention a method for online handwritten sub-word unit recognition on a communication means, using an application stored in a memory of a communication means; wherein the said method comprises the processor implemented steps of:

a. providing an online handwritten text input using an input means through an user interface to the said communication means;

b. sending the said online handwritten text input to spatio-temporal analysis module of the application; wherein the said spatio-temporal analysis module further comprises of a recognition engine for recognizing primitive strokes prior to sub-word units;

c. subjecting the text input of step b) to stroke extraction and separation module of the application to extract and separate the strokes by comparing the said strokes to a primitive stroke database;

d. subjecting the data of strokes obtained from step c) to the pre-processing module to pre-process the said extracted, separated and identified individual strokes by:
  i. reducing or removing the noise created due to the slow movement of the said input means using a noise removal module of the said pre-processing module to obtain noise free smooth data, and
  ii. optionally normalizing the size of the online handwritten text data by using the size normalization module of the pre-processing module;

e. subjecting the pre-processed primitive stroke data of step d) to feature extraction module for modeling and representing the online handwritten text input; wherein the feature extraction module further comprises of:
  i. critical point identification module pertaining algorithms for identifying the critical points in the pre-processed smoothed data, and ii. fuzzy directional features for representing the strokes in the pre-processed smoothed data;

f. subjecting the feature extracted data of step e) to stroke level recognition module for recognizing the primitive strokes, and further concatenating the said primitive strokes to form a sequence of strokes to further form a sub-word unit; wherein the stroke level recognition module further analyzes for any errors in the recognition of strokes using an evaluation and error analysis module;

g. in case of any error, the evaluation and error analysis module helps in improving the stroke recognition;

h. subjecting the sequence of recognized strokes of step f) for sub-word unit formation and sub-word unit recognition using the sub-word unit level recognition module; wherein the sub-word units are formed on the basis of the sub-word unit boundary information obtained from the sub-word unit boundary segmentation module and the defined rules for sub-word unit formation of the said sub-word unit level recognition module; wherein the sub-word unit recognition module further analyzes for any error in the recognition;

i. In case of any error, the sub-word unit recognition results are backtracked through the error analysis module and modified based on the failure of the sub-word unit formation namely to put together a sequence strokes to form a sub-word unit.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings, example constructions of the invention; however, the invention is not limited to the specific methods, script and hardware disclosed in the drawings.

DETAILED DESCRIPTION OF THE INVENTION

Figure 1:
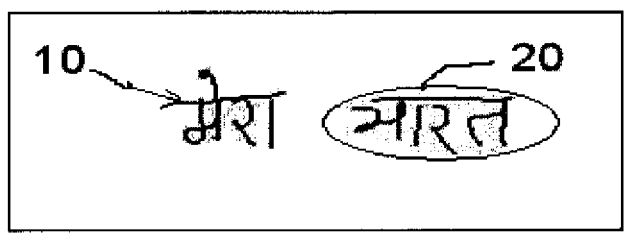
FIG. 1 of the present invention illustrates the formation of the phrase "Mera Bharat" in Devanagari script.

Before the present method and hardware enablement are described, it is to be understood that this invention in not limited to the particular methodologies, scripts and hardware described, as these may vary. It is also to be understood that the terminology used in the description is for the purpose of describing the particular versions or embodiments only, and is not intended to limit the scope of the present invention which will be limited only by the appended claims. The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items. The disclosed embodiments are merely exemplary methods of the invention, which may be embodied in various forms.

In one of the significant embodiment of the present invention a system for online handwritten sub-word unit recognition; wherein the said system comprising:

a. at least one communication means having an application stored in a memory of the said communication means; wherein the said communication means further comprises of an input means to provide online handwritten text input via the user interface of the said communication means; and b. the said application for online handwritten sub-word unit recognition comprising:
script independent modules; and
script dependent module.

According to one of the embodiment of the present invention, the script independent modules comprises of stroke extraction and separation module, pre-processing module, feature extraction module, stroke level recognition module, evaluation and error analysis module, word level recognition module and sub-word unit level recognition module; whereas the script dependent system comprises of spatio-temporal analysis module, rules based sub-word unit creation module and lexicon based word level knowledge or language model dictionary are script dependent modules.

The present invention provides a method for online script independent recognition of handwritten sub-word unit and words.

In a preferred embodiment of the present invention, the term "sub-word unit" refers to a member of alphabetic, characters or composite characters, logographic, and/or phonetic/syllabic character set, which includes syllables, alphabets, numerals, punctuation marks, consonants, consonant modifiers, vowels, vowel modifiers, and special characters, and/or any combination thereof.

In another preferred embodiment of the present invention, these sub-word units together form a word.

According to one of the embodiments of the present invention, in Devanagari script, the vowels following a consonant are orthographically indicated by signs called matras to form a consonant vowel combination. The modifier symbols are normally attached to the top, bottom, left or right of the base sub-word unit which is highly dependent on the consonant-vowel pair. The sub-word unit in Devanagari script refers to an "akshara" or "samyukthakshara".

FIG. 1 of the present invention illustrates the formation of the phrase "Mera Bharat" in Devanagari script.

Figure 2:
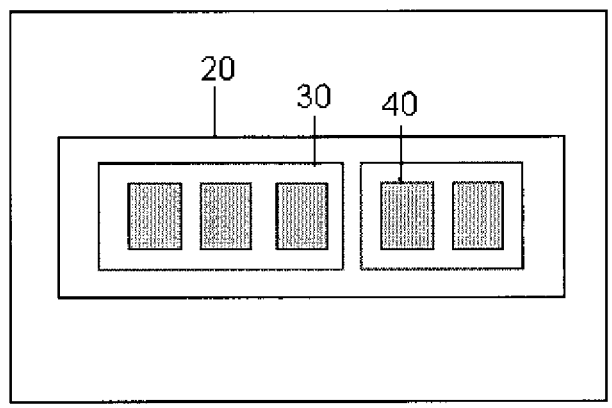
FIG. 2 of the present invention illustrates the word construction from sub-word unit, which are comprised of primitive strokes.

In a preferred embodiment of the present invention, in Devanagari script, the consonants, vowels, matras and the consonant/vowel modifiers constitute the entire alphabet set;

wherein these composite sub-word units are joined together by a horizontal line called shirorekha 10 to form words 20 as shown in FIG. 2.

FIG. 2 of the present invention illustrates the word construction from sub-word units, which are comprised of primitive strokes.

According to one of the embodiments of the present invention, sub-word units 30 are made up of multiple strokes 40; wherein the sub-word units 30 are identified on recognizing a sequence of strokes 40 that make a sub-word unit 30.

According to another embodiment of the present invention, the recognition engine primarily recognizes these primitive strokes 40 prior to sub-word units 30 and words 20.

Figure 3:
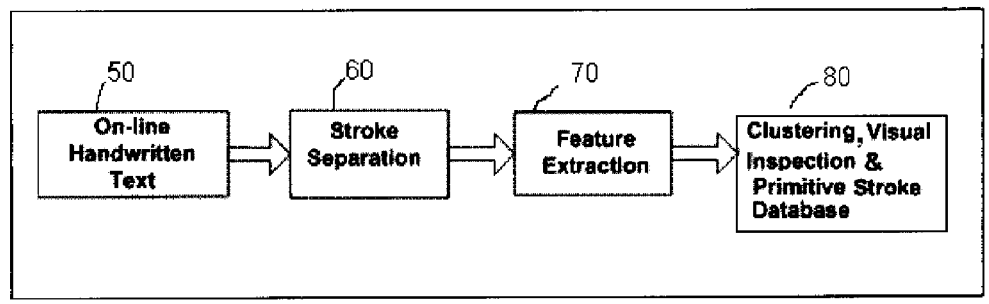
FIG. 3 of the present invention illustrates the steps involved in creating the primitive stroke database.

According to another embodiment of the present invention, FIG. 3 of the present invention illustrates the steps involved in creating the primitive stroke database.

Figure 13:
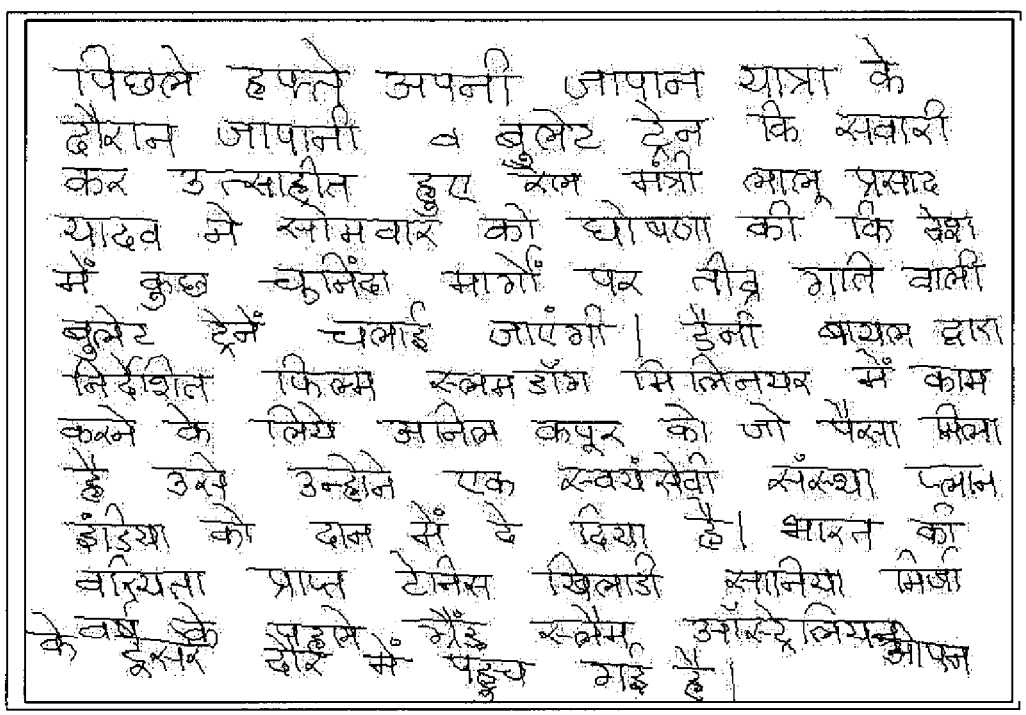
FIG. 13 of the present invention illustrates a typical online Devanagari Paragraph Data collected using an electronic pen device.

The steps are as follows:

50: Providing online handwritten text input 90 using the user interface to the communication means. FIG. 13 illustrates a typical online Devanagari Paragraph Data collected using an electronic pen device.

60: The online handwritten text input 90 provided in step 50 is then further analyzed and the individual strokes 40 are separated and modeled using the Fuzzy Directional Features (FDF) 160.

70: The separated and modeled strokes 40 are extracted using the feature extraction technique 170; wherein the strokes 40 are extracted based on the feature set i.e. directional properties of the curve connecting two consecutive critical points identified on a stroke using fuzzy directional features (FDF) 160.

In a preferred embodiment of the present invention, the identification of the curvature points 150 is considered to be a prerequisite for fuzzy directional feature extraction 160.

80: The extracted strokes are further classified into 69 primitive strokes and have been further clustered into Devanagari primitive stroke sets to form a primitive stroke database for Devanagari script.

The identified and clustered 69 primitive strokes for Devanagari script are represented in Table 1 below:

of strokes 40 to form a sub-word unit 30 and further a word 20 might vary from one language script to another language script.

Figure 4:
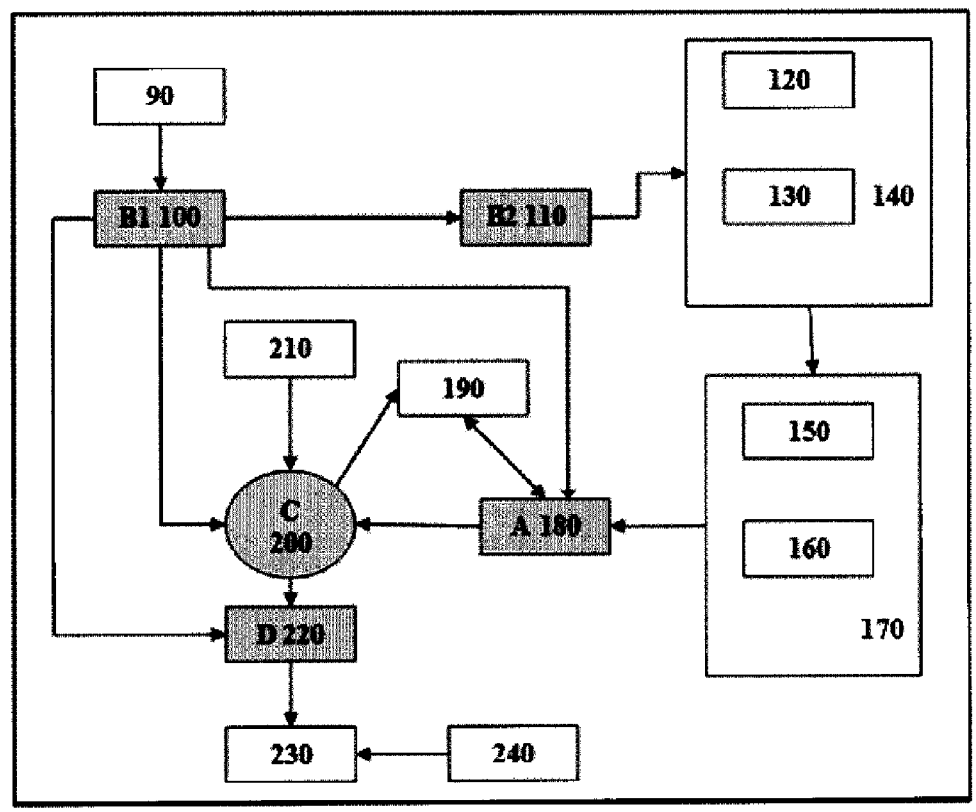
FIG. 4 of the present invention illustrates the architecture of online handwritten sub-word unit and word recognition system of the present invention for Indian languages.

FIG. 4 of the present invention illustrates the architecture of online script independent recognition of handwritten sub-word unit and words.

According to one of the embodiment of the present invention, the online handwritten text input 90 is provided by the user in his/her handwriting to the communication means using the user interface.

In a preferred embodiment of the invention the communication means comprises of but does not limit to a mobile phone, a Personal Digital Assistant or PDA, palm-top, mobile digital assistant, computer, laptop, notebook, personal computer or any portable communication device.

In a preferred embodiment of the present invention, the input means comprises of an electronic pen or stylus or stick; wherein the script independent handwritten text is written on writing panel or an electronic tablet or on the pressure sensitive touch screen of the communication means.

The online handwritten text input 90 provided by the user using the user interface to the communication means essentially is of data format which would be typically a trace of a pen between a pen-down and a pen-up process, which is a set of x, y points and are uniformly sampled in time. Also these set of points are non-uniformly sampled in space.

Further, a stroke can be represented by a variable number of 2D points which are in a time sequence. For example an online script would be represented as $$\{(x_{t1},y_{t1}),(x_{t2},y_{t2}),\ldots,(x_{tm},y_{tm})\} \quad (1)$$

Wherein, t denotes the time such that and n represents the total number of points. Equivalently, the online text data is represented as $$\{(x_1,y_1),(x_2,y_2),\ldots,(x_n,y_n)\} \quad (2)$$

by dropping the variable t. The number of points denoted by n varies depending on the size of the stroke 40 and also the time taken to write the stroke 40.

| 1. a | 2. ii | 3. e | 4. k | 5. hk | 6. K | 7. R | 8. hv | 9. g | 10. hgh |
|------|-------|------|------|-------|------|------|-------|------|---------|
| 11. gH | 12. D | 13. hc | 14. c | 15. ch | 16. hj | 17. j | 18. hnj | 19. tt | 20. Th |
| 21. dh | 22. N | 23. hT | 24. T | 25. hth | 26. th | 27. dd | 28. hD | 29. D | 30. hN |
| 31. N | 32. p | 33. hP | 34. P | 35. hbh | 36. bh | 37. hm | 38. m | 39. hy | 40. y |
| 41. hl | 42. l | 43. v | 44. sh | 45. hh | 46. h | 47. x | 48. Gn | 49. shr | 50. tra |
| 51. hu | 52. sA | 53. A | 54. hl | 55. I | 56. II | 57. u | 58. uU | 59. Rt | 60. hou |
| 61. ou | 62. hb | 63. cs | 64. cb | 65. aM | 66. sAb | 67. Ab | 68. AbA | 69. kya | |

In one of the preferred embodiment of the present invention, stroke level recognition module 180 is script independent even though the shape of the strokes 40 and the number According to another embodiment of the present invention, the online handwritten text input 90 acquired initially is further subjected to spatio-temporal analysis module (B1) 100 of individual strokes. Typically, the spatio-temporal analysis module (B1) 100 provides the ability to segment a paragraph of online handwritten text input 90 data into words 20 based on shirorekha identification 10 in case of Devanagari script, followed by identification of matras by identifying the relative position of the strokes 40.

Further, the spatio-temporal analysis module 100 may be used to improve the performance of the stroke recognition.

For example, in case of Devanagari script, once a matra is identified based on the spatial position of the stroke, the stroke recognition can be constrained to only the reference matras. The individual strokes 40 are then recognized to be one of the 69 primitives of Devanagari script of the primitive stroke database (for Devanagari script) 80.

On completion of the spatio-temporal analysis, the online handwritten text input 90 is further subjected to either stroke extraction and separation module (B2) 110 and further to stroke level recognition module (A) 180 or sub-word unit level recognition module (C) 200 or word level recognition module (D) 220 on the basis of relative spatial information of each identified primitive stroke 40.

In case of stroke extraction and separation, the primitive strokes are extracted, separated and identified as described in FIG. 3; wherein FIG. 3 of the present invention illustrates the steps involved in creating the primitive stroke database.

On completion of the process of stroke separation, the extracted, separated and identified stroke is further subjected to the algorithms of the pre-processing module 140; wherein the extracted, separated and identified strokes are further subjected to noise removal module 120 and optionally to size normalization module 130 processes.

According to one of the embodiment of the present invention, the noise in online handwritten text input 90 scripts is inherent, which severely affects the performance of online sub-word unit and word recognition algorithms of the online handwritten text input 90 script as the number of data points is very sparse, especially when the movement of the user interface such as pen or stylus is fast. Whereas the number of data points is very contaminated by high frequency noise in case of slow pen movement.

Further, the noise that contributes to the noisy data can be further classified into two types based on the following circumstances:

(a) due to the inherent shake of the hand of the writer especially at the beginning and end of the stroke and (b) Contribution by the noise creeping in due to digitization process.

In order to remove and reduce the noise created due to the above mentioned circumstances the following two processes are followed (a) a noise removal algorithm (typically Gaussian smoothing) is used on the raw noisy data, and (b) a feature extraction algorithm is used to compensate for the noise.

Figure 5:
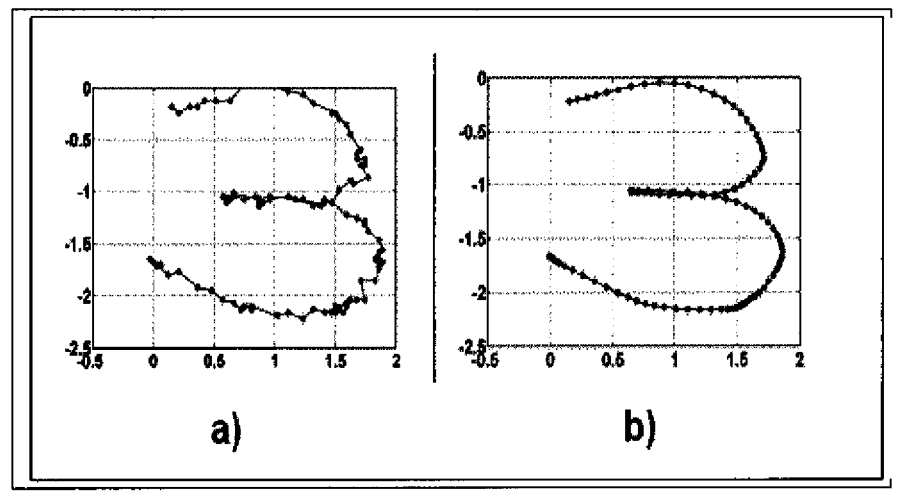
FIG. 5 of the present invention illustrates the effect of noise removal using smoothing on a Devanagari sub-word unit.

FIG. 5 of the present invention illustrates the effect of noise removal using smoothing on a Devanagari sub-word unit.

According to another embodiment of the present invention, feature extraction module 170, further involves two stages viz, identification of critical (also called as curvature points) points 150 and fuzzy directional feature extraction 160.

Identification of critical points 150 is based on the directional properties of the curve and the critical points occur at the points on the handwritten strokes where there is a large curvature change; wherein identification of the critical points is a prerequisite for feature extraction.

The critical points are extracted from the smoothed handwritten text data provided by the user. The denoised sequence $(x_i, y_i)_{i=0}^{n}$ represents a noise free handwritten stroke. $x_i$ and $y_i$ sequences are treated separately and the critical points are computed for each of these sequences. For the x sequence, the first difference $x'_i$ is calculated as $$x'_i = sgn(x_i - x_{i+1})$$

where, $$sgn(k) = +1 \text{ if } x_i - x_{i+1} > 0 \quad (3)$$

$$sgn(k) = -1 \text{ if } x_i - x_{i+1} < 0$$

$$sgn(k) = 0 \text{ if } x_i - x_{i+1} = 0$$

x' is used to compute the critical point in x sequence. Point i is considered as a critical point if and only if $$sgn(k) = 0 \text{ if } x_i - x_{i+1} = 0$$

$$x'_i - x'_{i+1} \neq 0$$

The critical points for the y sequence are calculated in the similar way. The final list of critical points is the union of all the points marked as critical points in both the x and the y sequence.

Figure 6:
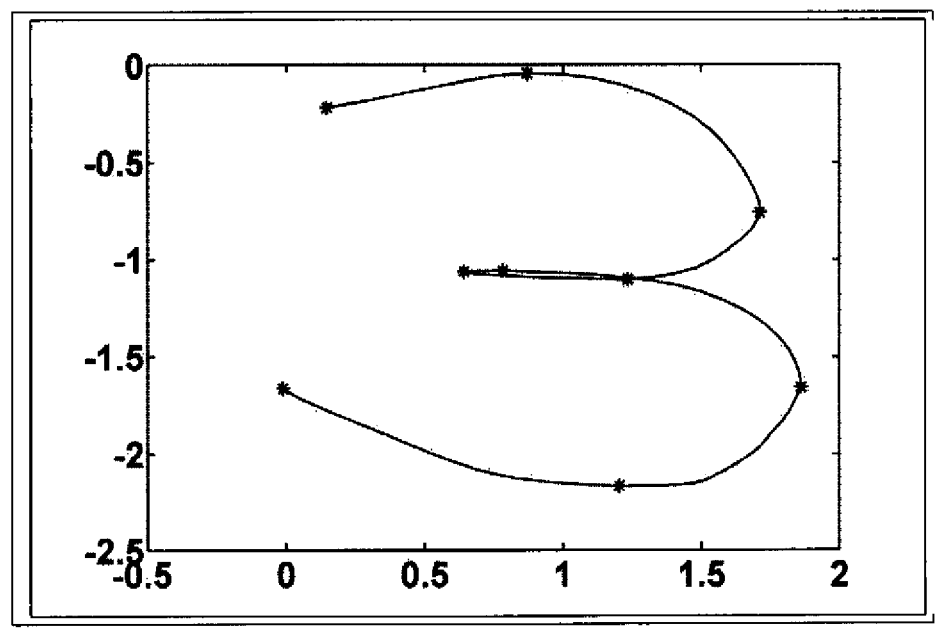
FIG. 6 of the present invention illustrates the critical points extracted on the smoothed Devanagari handwritten sub-word unit.

FIG. 6 of the present invention illustrates the critical points extracted on the smoothed Devanagari handwritten sub-word unit.

According to another embodiment of the present invention, another prerequisite for feature extraction is fuzzy directional feature extraction 160

Figure 7:
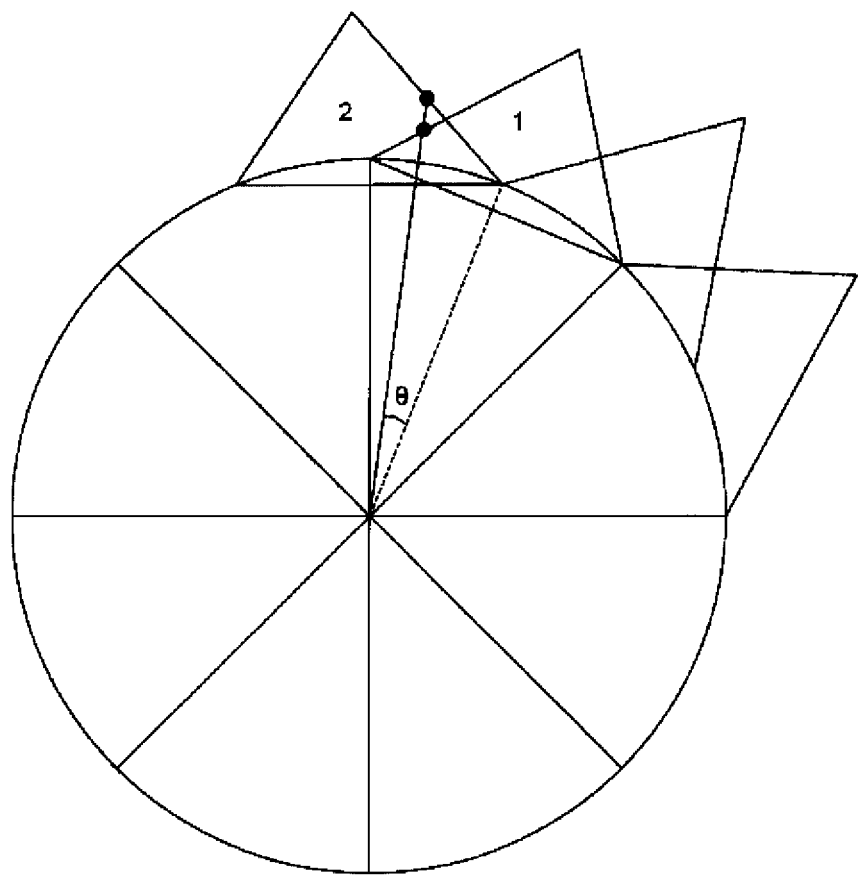
FIG. 7 of the present invention illustrates how the angle θ contributes to two directions (1, 2) with different fuzzy membership values (green and red dot).

The algorithm for fuzzy directional feature extraction 160 is as follows:

Let k be the number of critical points (denoted by $c_1, c_2, \ldots, c_k$) extracted from a stroke of length n; wherein usually k<<n. The k critical points form the basis for extraction of the fuzzy directional features. Firstly the angle between two critical points, say $c_l$ and $c_{l+1}$, is computed as $$\theta_l = \tan^{-1}\left(\frac{y_l - y_{l+1}}{x_l - x_{l+1}}\right)$$

Where $(x_l, y_l)$ and $(x_{l+1}, y_{l+1})$ are the coordinates corresponding to the critical point $c_l$ and $c_{l+1}$ respectively. It is to be noted that 2p is divided into P directions with overlap. Every $\theta_l$ (for example the angle $\theta$ that the blue dotted line makes with the horizontal axis as illustrated in FIG. 7, further has two directions ($d_{1l}$=1, $d_{2l}$=2, further the line making an angle $\theta$ with the dotted line in FIG. 7 lies in both the triangles represented by direction 1 and direction 2 associated with it having $m_{1l}$, $m_{2l}$ membership values respectively (represented by the green and the red dot respectively in FIG. 7.

Further, 1. $m_l^1 + m_l^2 = 1$ and

2. $d_l^1$, $d_l^2$ are adjacent directions, for example if $d_l^1$=5 then $d_l^2$ could be either 4 or 6

Algorithm 1 Conversion of Angles Between Two Critical Points into 8 Directions

```
int deg2dir(double θ)
    int dir = −1
    if (θ > −π/8 & θ < π/8) then
        dir = 1;
    end if
    if (θ > π/8 & θ < 3π/8) then
        dir = 2;
    end if
    if (θ > 3π/8 & θ < 5π/8) then
        dir = 3;
    end if
```

-continued

```
if (θ > 5π/8 & θ < 7π/8) then
    dir = 4;
end if
if ((θ>=7π/8 & θ < 9π/8) || (θ>= -9π/8 & θ < -7p/8) then
    dir =5;
end if
if (θ >-7π/8 & θ < -5p/8) then
    dir =6;
end if
if (θ >-5π/8 & θ < -3p/8) then
    dir =7;
end if
if (θ >-3π/8 & θ < -p/8) then
    dir =8;
end if
return(dir);
```

Algorithm 2 Triangular Fuzzy Membership Function

Fuzzy membership $(\theta_c, \theta)$;

$$m = 1.0 - \frac{(|(\theta_c - \theta)|)}{\frac{\Pi}{4}};$$

return (m);

θ is used in Algorithm 1 which is assisted by triangular membership function described in Algorithm 2 for computing the FDF 160 set. The same is represented in table 2 below:

TABLE 2

| Angle | Directions | | | | | | | |
|---|---|---|---|---|---|---|---|---|
| | 1 | 2 | 3 | 4 | 5 | 6 | 7 | 8 |
| $\theta_1$ | | | $m_1^1$ | $m_1^2$ | | | | |
| $\theta_2$ | $m_2^1$ | $m_2^2$ | | | | | | |
| $\theta_3$ | $m_3^2$ | | | | | | | $m_3^1$ |
| $\theta_i$ | | | | | | | $m_1^2$ | $m_1^1$ |
| $\theta_{k-1}$ | | | | | $m_{k-1}^2$ | $m_{k-1}^1$ | $m_1^2$ | |
| F | $f1 = \frac{(m_2^2 + m_3^2)}{2}$ | $f2 = m_2^2$ | $f3 = m_1^1$ | $f4 = m_1^2$ | $f5 = m_{k-1}^2$ | $f6 = m_{k-1}^1$ | $f7 = m_1^2$ | $f8 = \frac{(m_3^1 + m_1^1)}{2}$ |

$\theta_{t, k-1}$ is the angle between two consecutive critical points (where k is the total number of critical points) in a handwritten primitive and $d_{1 \ldots 8}$ is the respective direction. Wherein, P=8 is considered and used to describe the process.

The fuzzy membership values assigned to each direction are represented as $m_{1,k-1}^{1,2}$ and the corresponding feature vector values as $f_1 \ldots$ and $f_8$. Further, the sum of the membership functions of a particular row as represented in Table 2 is always 1.

FDF 160 is calculated by taking average across the columns, so as to form a vector of dimension eight. The mean is further calculated as follows;

For each direction (1 to 8), all the membership values are collected and divided by the number of occurrences of the membership values in that direction.

For example as represented in Table 2, the mean for direction 1 is calculated as $$f1 = \frac{(m_2^2 + m_3^2)}{2}. \tag{8}$$

Further, these mean values are used to construct 8 directional FDF 160 to represent a stroke 40. Further, the membership function associates the angle between two critical points into two directions with different membership values. In the commonly used Directional Features only one direction is associated with each θ (the angle between two consecutive critical points).

Further, FIG. 7 of the present invention illustrates how the angle θ is contributing to the two directions (1, 2) with different fuzzy membership values (green and red dot).

According to another embodiment of the present invention, once the feature extraction is completed for the online handwritten text input 90 provided by the user, the extracted handwritten text data is further subjected to stroke level recognition module (A) 180.

Figure 8:
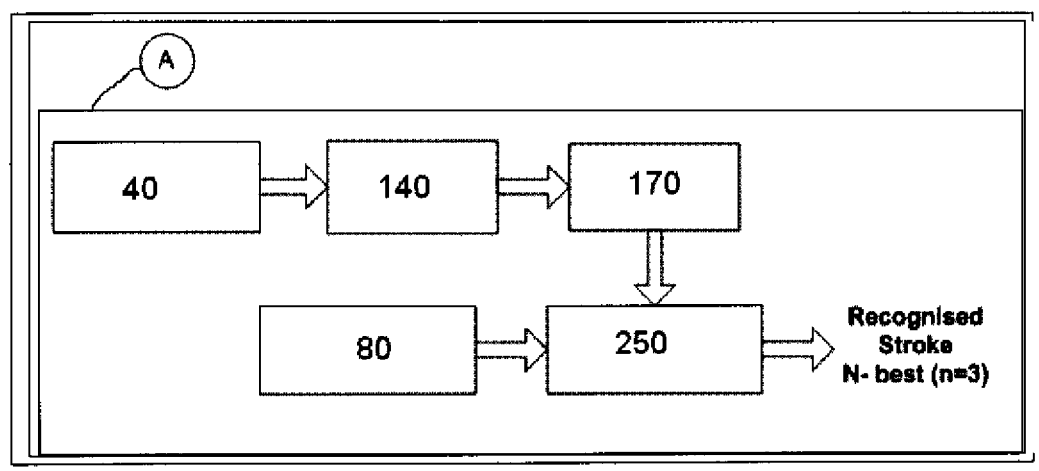
FIG. 8 of the present invention illustrates a block diagram indicating the steps involved in primitive stroke recognition.

FIG. 8 of the present invention illustrates a block diagram indicating the steps involved in primitive stroke recognition.

The stroke level recognition module (A) 180 is described in details in FIG. 8; wherein the method of recognizing primitive strokes consists of the following two phases:

1. Learning phase: In the learning phase, the system learns and builds reference models for all primitive strokes 40 in the primitive stroke database 80.
2. Testing Phase: In the testing phase the stroke 40 is compared with the primitive stroke database using a recognizer 250 to determine the best matching (n-best where n=3) reference stroke.

The primitive stroke extraction and separation (B2) 110 and the stroke level recognition (A) 180 are performed prior to the sub-word unit level recognition 200. The recognized strokes with n best match (n=3) are considered for sub-word unit level recognition 200. The rule based sub-word unit formation 210 compares the sub-word unit boundary information along with the relative position of the strokes used to in ascertain if the recognized sequence of strokes are valid or not. If the strokes are valid then, the sub-word unit level recognition 200 further processes the processed online handwritten text data 90 to word recognition level (D) 220. If the strokes are not valid, then the strokes are further evaluated and analyzed for any possible errors using the evaluation and error analysis process 190.

Figure 9:
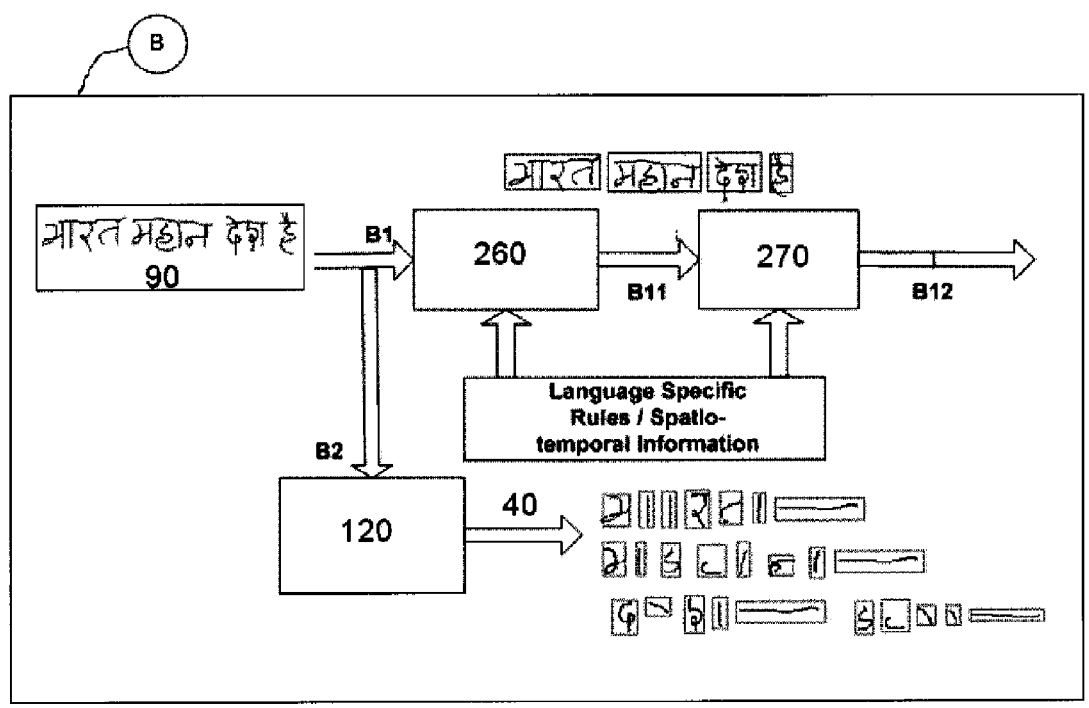
FIG. 9 of the present invention illustrates the procedure adapted for word and sub-word unit boundary detection and stroke extraction and segmentation.

FIG. 9 of the present invention illustrates the procedure adapted for word and sub-word unit boundary detection and stroke extraction and segmentation.

According to one of the embodiments of the present invention, the online handwritten text input 90 provided by the user using the user interface to the communication means. The online handwritten text input 90 acquired initially is further subjected to spatio-temporal analysis module (B1) 100 of individual strokes 40. Typically, the spatio-temporal analysis module (B1) 100 provides the ability to segment a paragraph of online handwritten text input 90 data into words 20 based on shirorekha identification 10 in case of Devanagari script, followed by identification of matras by identifying the relative position of the strokes 40.

Further, the spatio-temporal analysis module 100 may be used to improve the performance of the stroke recognition. For example, once a matra is identified based on the spatial position of the stroke, the stroke recognition can be constrained to only the reference matras. The individual strokes are then recognized to be one of the 69 primitives of the primitive stroke database for Devanagari script.

On completion of the spatia-temporal analysis, the Devanagari handwritten text 90 can be further subjected to either stroke extraction and segmentation (B2) 110 and further to stroke level recognition module 180 or sub-word unit recognition level module 200 or word level recognition module 220 on the basis of relative spatial information of each identified primitive stroke 40.

When the online handwritten text input 90 is subjected directly to word recognition module 220, the word boundaries are identified using the word boundary segmentation module 260 from the online handwritten text input 90 and the output words B11 are then further subjected to sub-word unit boundary segmentation module 270 to identify the sub-word units B12.

When the online handwritten text input 90 is subjected to stroke extraction and segmentation module 120 each stroke is segmented which is further send to primitive stroke recognition module 180 for recognizing individual strokes.

In a preferred embodiment of the present invention, the language script specific rules and spatio-temporal information is used to detect the word and sub-word unit boundaries.

Figure 10:
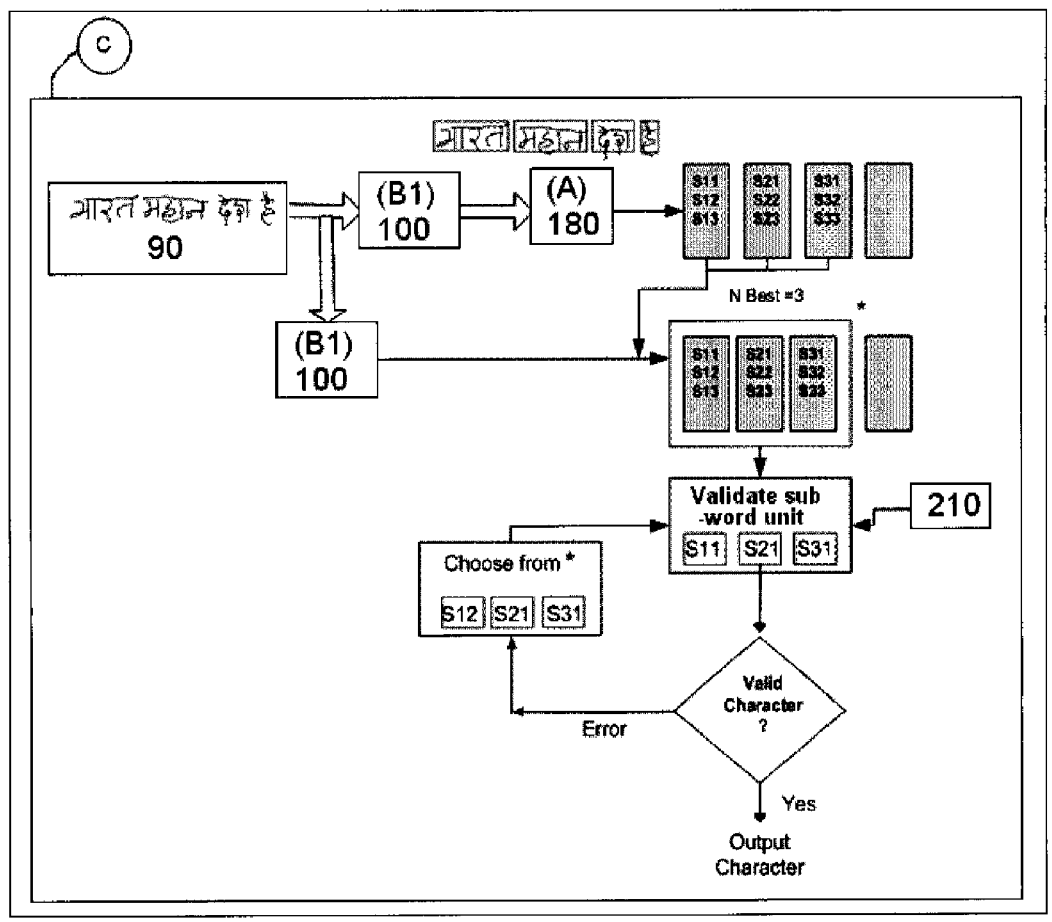
FIG. 10 of the present invention illustrates the methodology used for sub-word unit recognition.

FIG. 10 of the present invention illustrates the methodology used for sub-word unit recognition.

According to one of the embodiments of the present invention, the online handwritten text input 90 provided by the user using the user interface to the communication means. The online handwritten text input 90 acquired initially is further subjected to spatio-temporal analysis module (B1) 100 of individual strokes 40. Typically, the spatio-temporal analysis module 100 provides the ability to segment a paragraph of online handwritten text input 90 data into words 20 based on shirorekha identification 10 in case of Devanagari script, followed by identification of matras by identifying the relative position of the strokes 40.

Further, the spatio-temporal analysis module 100 may be used to improve the performance of the stroke recognition. For example, once a matra is identified based on the spatial position of the stroke, the stroke recognition can be constrained to only the reference matras. The individual strokes are then recognized to be one of the 69 primitives of the primitive stroke database for Devanagari script.

On completion of the spatio-temporal analysis, the online handwritten text input 90 is further subjected to stroke extraction and segmentation module 110 and further to stroke level recognition module 180 on the basis of relative spatial information of each identified primitive stroke 40.

When the online handwritten text input 90 is subjected directly to stroke extraction and segmentation module 110 each stroke is segmented which is further send to primitive stroke recognition module 180 for recognizing individual strokes.

The primitive stroke extraction and separation module (B2) 110 and the stroke level recognition module (A) 180 are performed prior to the sub-word unit level recognition module 200. The recognized strokes with n best match (n=3) are considered for sub-word unit level recognition 200. The rule based sub-word unit formation 210 compares the sub-word unit boundary information along with the relative position of the strokes used to in ascertain if the recognized sequence of strokes are valid or not. If the strokes are valid then, the sub-word unit level recognition 200 further processes the processed online handwritten text data 90 to word recognition level (D) 220. If the strokes are not valid, then the strokes are further evaluated and analyzed for any possible errors using the evaluation and error analysis process 190.

Figure 11:
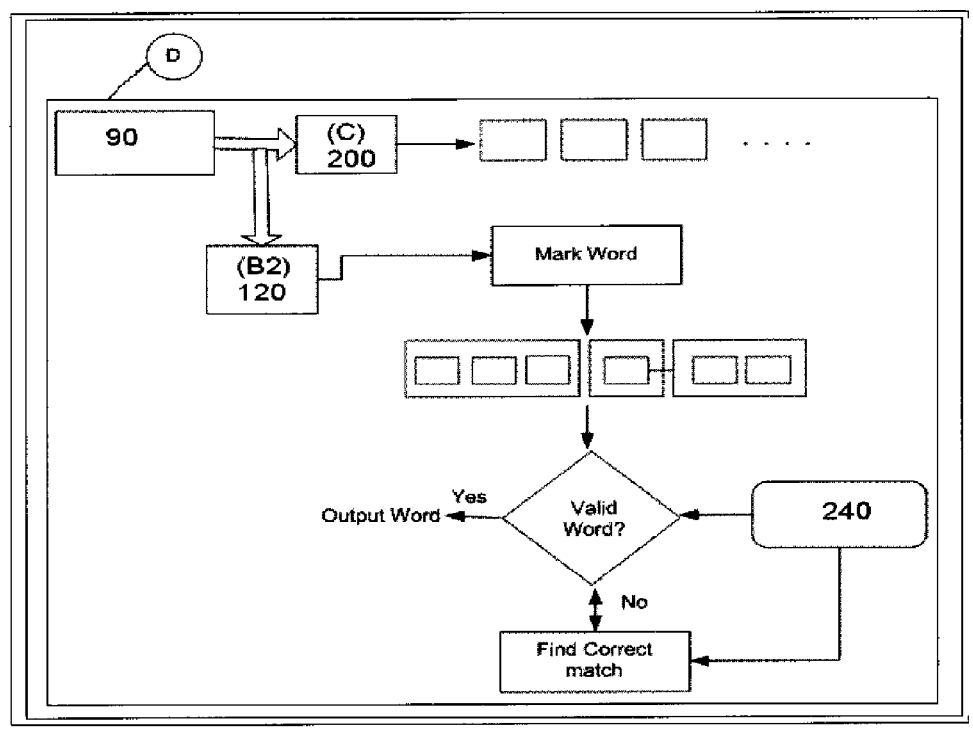
FIG. 11 of the present invention illustrates the approach used by the system of the present invention for word recognition.

FIG. 11 of the present invention illustrates the approach used by the system of the present invention for word recognition.

According to one of the embodiments of the present invention, the online handwritten text input 90 provided by the user using the user interface to the communication means. The online handwritten text input 90 acquired initially is further subjected to spatio-temporal analysis module (B1) 100 of individual strokes 40. Typically, the spatio-temporal analysis module 100 provides the ability to segment a paragraph of online handwritten text input 90 data into words 20 based on shirorekha identification 10 in case of Devanagari script, followed by identification of matras by identifying the relative position of the strokes 40.

Further, the word recognition module 220 which is based on a lexicon based word knowledge 240 making it adoptable for any Indian language. The steps involved are illustrated in the FIG. 11; wherein the output of the sub-word unit recognition level module (C) 200 as described in FIG. 10, and the word boundary information (B1) 100 as described in FIG. 9 along with the primitive stroke extraction results (B2) 110 from FIG. 9 are used for word recognition in the word recognition module (D) 220. The words in the lexicon based word knowledge 240 are an important aspect of achieving acceptable accuracy for online handwritten sub-word unit and word recognition. Further the lexicon based word knowledge 240 is used for verifying and improving the word recognition results as represented in FIG. 11.

Figure 12:
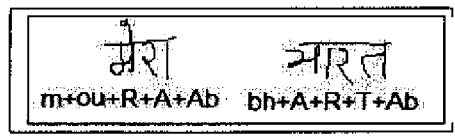
FIG. 12 of the present invention illustrates an exemplary embodiment, where primitives (m, ou, R, A, Ab, ***) are combined together to form sub-word unit, resulting into words. We can recognize the Devanagari sub-word unit by recognizing the primitives and analyzing a sequence of primitives to identify a sub-word unit.

FIG. 12 of the present invention illustrates an exemplary embodiment, where primitive strokes 40 (m, ou, R, A, Ab, \*\*\*) are combined together to form sub-word units 30, resulting into words 20. The formation of Devanagari sub-word unit by the concatenation of sequence of primitives strokes 40 and hence words 20 by a sequence of sub-word units 30 is illustrated in FIG. 12; wherein the Devanagari sub-word units are recognized based on the primitives and a sequence of primitives are analyzed to identify a sub-word unit. The rules for sub-word unit formation from a sequence of strokes are formed for each sub-word unit in Devanagari. The rules set along with the primitive recognition results for the recognition of sub-word units are used.

Further, it is obvious to a person skilled in art that the invention is not limited to the type of script used to describe and illustrate the particular methodologies, and hardware described, as these may vary. Further, the use of particular script (s), methodologies, and hardware (s) described is not intended to limit the scope of the present invention. The disclosed embodiments are merely exemplary methods of the invention, which may be embodied in various forms for various scripts, methodologies and hardware described, as these may vary.

Advantages of the Invention

The present invention provides a system and a method for online script independent handwritten sub-word unit and word.

Provides the English illiterate individuals to communicate using the script independent system and method.

Provides a platform to enable input in non-English languages

Provides an easy and natural to use method for handwritten sub-word unit and word recognition, wherein the application can be deployed on the existing communication means.

We claim:

1. A method for recognizing a handwritten sub-word unit for a script, the method comprising:
   - receiving, by a processor, a handwritten-text on an user interface;
   - segmenting, by the processor, the handwritten-text into words, each word comprising sub-word units;
   - segmenting strokes from the sub-word units such that each sub-word unit comprises one or more strokes;
   - identifying critical points on a stroke of the one or more strokes based on directional properties of a curve present in the stroke, wherein the critical points are representative of a curvature change in the stroke;
   - determining fuzzy directional features based on an angle between consecutive critical points on the stroke and two or more directions associated with the angle between the consecutive critical points, wherein the fuzzy directional features represent the stroke;
   - extracting one or more reference strokes from a primitive stroke database based upon a matching of the strokes with the primitive stroke database, wherein the primitive stroke database comprises a plurality of reference strokes for the script;
   - combining, by the processor, the one or more reference strokes based on a rule set to generate the sub-word unit, wherein the rule set is script specific.

2. The method of claim 1, further comprising preprocessing the strokes by removing noise present in the strokes due to slow movement of an input means used for inputting the handwritten-text in the user interface, wherein the input means comprises at least one of: a special electronic pen, a stylus, and a stick; and
   normalizing a size of the handwritten-text.

3. The method of claim 1, wherein combining further comprises validating a sequence of the one or more reference strokes to generate the sub-word unit based on the rule set.

4. The method of claim 1, further comprising combining a sequence of one or more sub-word units to generate a word based on a lexicon based word level knowledge or a language model dictionary.

5. The method of claim 1, wherein the user interface comprises at least one of: a writing panel, an electronic tablet, and a pressure sensitive touch screen of a communication means.

6. A system for recognizing a handwritten sub-word unit for a script, the method comprising:
   - a processor; and
   - a memory coupled to the processor, wherein the processor is wherein the processor is capable of executing program instructions stored in the memory, the program instructions that are configured to cause the processor to:
   - receive a handwritten-text on an user interface;
   - segment the handwritten-text into words, each word comprising sub-word units;
   - segment strokes from the sub-word units such that each sub-word unit comprises one or more strokes;
   - identify critical points on a stroke of the one or more strokes based on directional properties of a curve present in the stroke, wherein the critical points are representative of a curvature change in the stroke;
   - determine fuzzy directional features based on an angle between consecutive critical points on the stroke and two or more directions associated with the angle between the consecutive critical points, wherein the fuzzy directional features represent the stroke;
   - extract one or more reference strokes from a primitive stroke database based upon a matching of the strokes with the primitive stroke database, wherein the primitive stroke database comprises a plurality of reference strokes for the script; and
   - combine the one or more reference strokes based on a rule set to generate the sub-word unit, wherein the rule set is script specific.

* * * * *

UNITED STATES PATENT AND TRADEMARK OFFICE
CERTIFICATE OF CORRECTION

PATENT NO. : 8,768,062 B2  Page 1 of 1
APPLICATION NO. : 13/292145
DATED : July 1, 2014
INVENTOR(S) : Lakshmanan It is certified that error appears in the above-identified patent and that said Letters Patent is hereby corrected as shown below:

In the Claims:

Col. 16, Claim 6, Line 12, "method" should be --system--

Col. 16, Claim 6, Line 15, "wherein the processor is wherein the processor is" should be --wherein the processor is-- (appears twice)

Signed and Sealed this
Thirtieth Day of September, 2014

Michelle K. Lee
*Deputy Director of the United States Patent and Trademark Office*

UNITED STATES PATENT AND TRADEMARK OFFICE
CERTIFICATE OF CORRECTION

PATENT NO.          : 8,768,062 B2
APPLICATION NO.     : 13/292145
DATED               : July 1, 2014
INVENTOR(S)         : Lakshmanan Page 1 of 1

It is certified that error appears in the above-identified patent and that said Letters Patent is hereby corrected as shown below:

Title Page: Item 73 Assignee: "Tata Consulting Services Limited" should be -- Tata Consultancy Services Limited --

Signed and Sealed this
Seventeenth Day of March, 2015

Michelle K. Lee
*Director of the United States Patent and Trademark Office*